US011834194B2

(12) United States Patent
Updegrove et al.

(10) Patent No.: US 11,834,194 B2
(45) Date of Patent: Dec. 5, 2023

(54) REHOSTED FLIGHT OPERATION COMMAND AND CONTROL EXECUTIVE

(71) Applicant: Rockwell Collins, Inc., Cedar Rapids, IA (US)

(72) Inventors: Jessica Updegrove, Fairfax, VA (US); Andrew Jeffrey, Anamosa, IA (US); Bruce Spurgeon, Hiawatha, IA (US); Joseph Bender, Marion, IA (US); David Swenzinski, Marion, IA (US); Randy Dick, Solon, IA (US); Elie Bardawil, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 402 days.

(21) Appl. No.: 17/129,128

(22) Filed: Dec. 21, 2020

(65) Prior Publication Data
US 2022/0198939 A1   Jun. 23, 2022

(51) Int. Cl.
| G09B 9/08 | (2006.01) |
| B64D 43/00 | (2006.01) |
| G06F 9/54 | (2006.01) |
| B64D 45/00 | (2006.01) |

(52) U.S. Cl.
CPC .............. *B64D 43/00* (2013.01); *B64D 45/00* (2013.01); *G06F 9/54* (2013.01); *G09B 9/08* (2013.01)

(58) Field of Classification Search
None
See application file for complete search history.

(56) References Cited

U.S. PATENT DOCUMENTS

| 5,488,713 A | * | 1/1996 | Norton ................ G06F 11/3457 |
| | | | 703/22 |
| 5,678,044 A | | 10/1997 | Pastilha et al. |
| 6,654,950 B1 | | 11/2003 | Barnishan |
| 8,448,146 B2 | | 5/2013 | Pasala et al. |

(Continued)

FOREIGN PATENT DOCUMENTS

| EP | 2755137 A1 | 7/2014 |
| KR | 20180002553 A | 1/2018 |

*Primary Examiner* — Peter D Nolan
*Assistant Examiner* — Jacob Kent Besteman-Street
(74) *Attorney, Agent, or Firm* — Suiter Swantz pc llo

(57) ABSTRACT

A rehosted flight operation system is disclosed. The system comprises one or more controllers configured to execute program instructions. The program instructions include a rehosted flight operation module configured to generate one or more emulated flight operation subsystems, and a host flight operation module configured to generate flight operation data and flight operation commands. The rehosted flight operation module is further configured to: schedule each of the emulated flight operation subsystems at respective scheduled processing rates, measure respective runtime processing rates of each of the emulated flight operation subsystems, and responsive to the runtime processing rate of at least one of the emulated flight operation subsystems being unequal to the corresponding scheduled processing rate of the emulated flight operation subsystem, automatically adjust the scheduled processing rate of the emulated flight operation subsystem to match the runtime processing rate of the emulated flight operation subsystem.

13 Claims, 4 Drawing Sheets

(56) References Cited

U.S. PATENT DOCUMENTS

| | | |
|---|---|---|
| 8,881,139 B1 | 11/2014 | Acacio |
| 10,061,690 B2 | 8/2018 | Cho |
| 10,452,111 B2 | 10/2019 | Schauer et al. |
| 2010/0266991 A1* | 10/2010 | Gregoire ................ G09B 9/301 |
| | | 434/38 |
| 2019/0065351 A1 | 2/2019 | Rakhmilevich et al. |
| 2019/0303188 A1* | 10/2019 | Shelton ............... G06F 9/45558 |

* cited by examiner

REHOSTED FLIGHT OPERATION COMMAND AND CONTROL EXECUTIVE

SUMMARY

A rehosted flight operation system is disclosed in accordance with one or more embodiments of the present disclosure. In one illustrative embodiment, the system comprises one or more controllers including one or more processors configured to execute program instructions. The program instructions include a rehosted flight operation module, wherein the rehosted flight operation module causes the one or more processors to: generate one or more emulated flight operation subsystems; and a host flight operation module, wherein the host flight operation module causes the one or more processors to: generate flight operation data and flight operation commands for the one or more emulated flight operation subsystems. The rehosted flight operation module further causes the one or more processors to: schedule each of the emulated flight operation subsystems at respective scheduled processing rates, measure respective runtime processing rates of each of the emulated flight operation subsystems, and responsive to the runtime processing rate of at least one of the emulated flight operation subsystems being unequal to the corresponding scheduled processing rate of the at least one emulated flight operation subsystem, automatically adjust the scheduled processing rate of the at least one emulated flight operation subsystem to match the runtime processing rate of the at least one emulated flight operation subsystem.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which.

DETAILED DESCRIPTION

Figure 1:
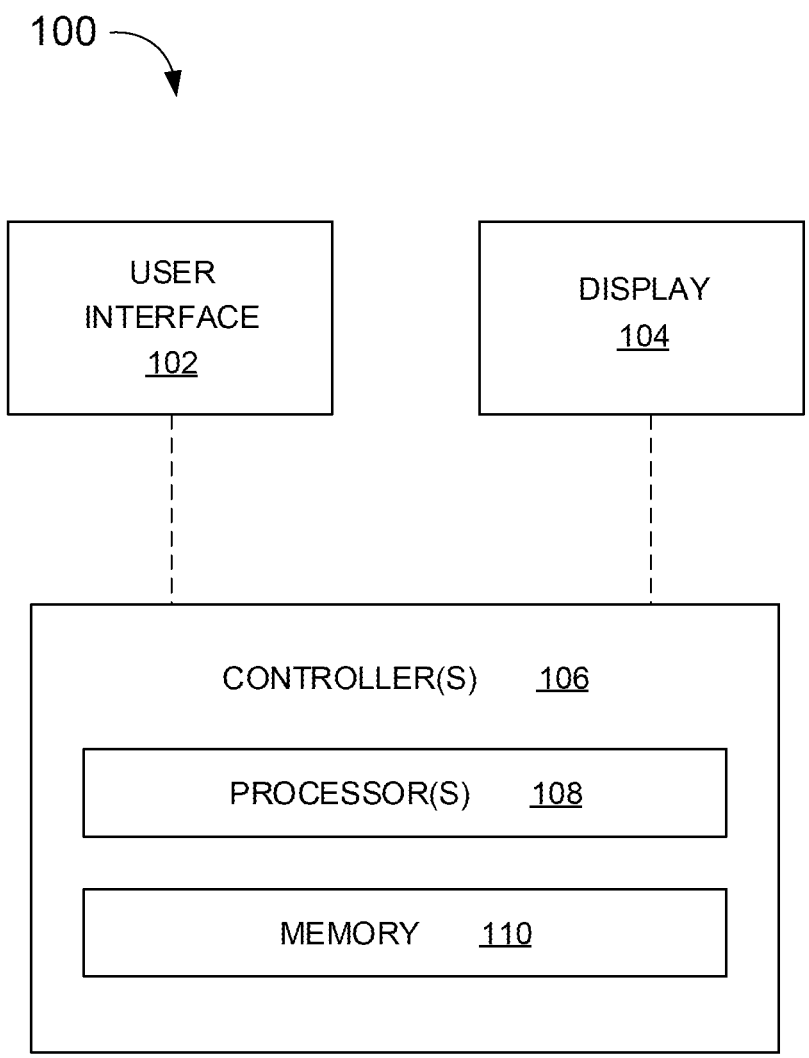
FIG. 1 is a diagram illustrating a rehosted flight operation system, in accordance with one or more embodiments of the present disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the present disclosure, numerous specific details are set forth in order to provide a more thorough understanding of the inventive concepts. However, it will be apparent to one of ordinary skill in the art having the benefit of the present disclosure that the inventive concepts disclosed herein may be practiced without these specific details. In other instances, well-known features may not be described in detail to avoid unnecessarily complicating the present disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). In addition, use of the "a" or "an" are employed to describe elements and components of embodiments of the present inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the present disclosure.

Operational flight programs (OFPs) control and monitor aircraft systems including cockpit displays, engines, control surfaces, and the like. Although different aircraft manufacturers develop proprietary OFPs for their particular aircraft, manufacturers commonly encounter difficulty when attempting to develop in-house software to test OFPs for engineering purposes or to train aircraft pilots using the OFPs. To this end, it is desirable to operate OFPs using flight emulation and flight simulation. Flight emulation entails executing an OFP on hardware not originally intended for use with the OFP (e.g., a personal computer instead of an embedded system of a real aircraft). Flight simulation entails modeling physical aeronautical interactions that influence aircraft flight, applications of flight controls, and external factors such as air density, turbulence, wind shear, cloud, precipitation, etc. Flight emulation and simulation are used for a variety of reasons, including flight training (mainly of pilots), the engineering of the aircraft itself, and research into aircraft characteristics and control handling qualities.

Some operational flight program systems include avionics trainers, verification tool suites, desktop trainers, part-task trainers, maintenance trainers, fixed-based trainers, and full-flight simulators (FFSs) that are certified by aviation authorities, such as the Federal Aviation Administration (FAA) for a highly technical and realistic degree of flight simulation.

It is desirable to integrate operational OFPs developed by aircraft manufacturers into a rehosted operational flight program (ROFP). An ROFP brings enhanced fidelity to a flight operation (e.g., simulation) by natively executing code and data processing functionally identical to the real aircraft being tested (e.g., by emulation). Additionally, an ROFP may add additional functionalities that the original flight operation systems lack (e.g., the ability to stop or freeze a flight simulation, or to transport simulated aircraft from one location to another in a flight simulation). The additional functionalities support various training exercises, often focusing on usability, cost, and time savings. For example, an ROFP may add functionalities that are defined by the Aeronautical Radio, Incorporated (ARINC) 610 standard. The ARINC 610 standard provides guidance for the functionality of avionics equipment and software in flight simulations. Some of the major functionalities that ARINC supports include data manipulation (e.g., modifying aircraft data or flight plans) and environmental changes (e.g., wind speed and direction), repositioning to initial conditions, and snapshots and recalls (e.g., phase of flight changes).

The conventional method of delivering an ROFP to a customer (e.g., aircraft manufacturer) is complex and confusing, often requiring large amounts of customer support spanning years at a time. Despite ROFPs being intended to work cohesively with a variety of aircraft OFP systems, the usual piecemeal deliveries are difficult to test, difficult to maintain in quality across customers, and require large amounts of ongoing engineering and customer support. Different aircraft manufacturers develop proprietary flight OFP systems using hardware and software that are unique to the respective manufacturer. For example, some aircraft manufacturers develop OFP systems to operate on generic personal computers (PCs) using a first programming language, while other aircraft manufacturers develop their OFP systems to operate on custom hardware including application-specific integrated circuits (ASICs) and/or field-programmable gate-arrays (FPGAs) using a second programming language different from the first programming language. Thus, it is difficult and time-consuming to develop and support custom software libraries or extensions to integrate each different OFP system into an ROFP. Additionally, under-performing hardware can cause the ROFP to run inefficiently and incorrectly, causing visual glitches and failure messages and resulting in a low fidelity simulation. Thus, an ROFP system that advantageously reduces integration difficulty and that reduces visual glitches and errors is desirable.

Embodiments of the present disclosure are directed to a rehosted flight operation system that reschedules processing rates of emulated flight operation modules (e.g., emulated flight display modules) to account for under-performing hardware executing a host flight operation module (e.g., original or target code of an aircraft manufacturer). The system may automatically identify, evaluate, and reschedule problematic processes. Additionally, the processing rates of emulated modules may be manually evaluated and rescheduled for real-time system performance debugging. Thus, the present system creates a smooth cockpit experience when integrated with low fidelity OFP systems. Additionally, the present system enables the use of common and affordable hardware. For example, the present system may operate on a commercial-off-the-shelf (COTS) computer running the Windows® 10 (registered trademark of Microsoft, Redmond WA) operating system or a Linux operating system, as opposed to, for example, a full-flight simulator cockpit with custom ASIC and FPGA hardware. However, it is contemplated that the present system is not limited to operating on personal computers, or any one particular type of computing system, and may operate on custom full-flight simulator hardware, a distributed computing system, etc.

The rehosted flight operation system may include a rehosted flight operation module (e.g., a rehosted command and control executive) that automatically evaluates the execution of emulated flight operation modules and subsequently adjusts the scheduling of the emulated modules (e.g., emulated flight display modules, emulated engine modules, etc.). In some embodiments, the rehosted control module may include a graphical user interface (GUI) to monitor data processing rates and evaluate the execution of the flight operation in real time. The rehosted flight operation module may be similar to the Rehost Input Output (RHINO) or Rehost Executive (tRex) software developed by Rockwell Collins, Inc. (Cedar Rapids, IA). The rehosted flight operation module may be implemented using a software development kit (SDK) such that the rehosted module can be repurposed and integrated with a variety of different host flight operation modules (e.g., the original or target flight operation modules developed by different manufacturers as described previously). The SDK may be similar to, for example, the Collins Avionics Software Application (CASA) SDK developed by Rockwell Collins, Inc. (Cedar Rapids, IA).

The system may also include one or more application programming interface (APIs) to facilitate communication between the rehosted flight operation module and the host flight operation module. The API(s) may provide calls or requests to create, read, update, and delete data (e.g., flight operation data and flight operation commands) from the host flight operation module to the rehosted flight operation module, or vice versa. In some embodiments, the API(s) may provide paths to transmit flight operation data (e.g., current speed, current altitude, current thrust) from the host operation module to the rehosted operation module. In some embodiments, the API(s) may provide paths to transmit flight operation commands (e.g., start the flight simulation, pause or freeze the flight simulation, increase engine thrust, disengage parking brake, etc.) from the host operation module to the rehosted operation module. The API(s) may simulate an avionics data bus (e.g., defined by avionics communication protocol) to provide a highly realistic and immersive flight operation experience. The API(s) may be implemented as part of the rehosted system SDK such that the system is packaged, tested, and delivered to customers as a full solution, offering easier-to-read configuration files, greatly reduced customer support, and a variety of new features in a less complex package.

In this way, the rehosted flight operation module may be easily integrated with host flight operation modules across different customers (e.g., aircraft manufacturers and/or flight simulator developers) using cohesive, easy-to-understand API(s) and may be implemented using a single SDK. In this way, the present rehosted flight operation system advantageously enables fast and effective deployment of the system with new customers and reduces the on-going support burden with existing customers. Additionally, the rehosted flight operation module (e.g., the control or executive module) advantageously enables the reduction of visual glitches and errors when there is a difference between a scheduled rate of an emulated module and a run-time rate of the emulated module (e.g., the display rate of an emulated flight display).

FIG. 1 is a diagram of a rehosted flight operation system 100. The rehosted flight operation system may include controller(s) 106 (i.e., computers or computing systems) including one or more processor(s) 108 and a memory 110. The one or more processors 108 may include one or more central processing unit (CPUs), graphics processing units (GPUs), application-specific integrated circuits (ASICs), field-programmable gate arrays (FPGAs), and/or other processors or hardware accelerators. The memory 110 may include nonvolatile memory (e.g., hard disk drive [HDD], solid state disk [SSD], flash memory, ROM, etc.) and volatile memory (RAM, SDRAM, etc.). In some embodiments, at least one of the controller(s) 106 may be located remotely (e.g., as part of a cloud-computing system) and may receive data transmitted over a network.

The one or more processors 108 may be configured to execute program instructions (e.g., modules, software, programs, scripts, libraries, extensions etc.) stored on the memory 110 that cause the one or more processors 108 perform various functions, procedures, algorithms, etc. described in the present disclosure. For example, the program instructions may include a flight operation module (e.g., host operation module), a rehosted flight operation module (e.g., control or executive module), an API module, etc.

The memory 110 may include any storage medium known in the art suitable for storing program instructions executable by the associated one or more processors 108. For example, the memory 110 may include a non-transitory memory medium. It is further noted that the memory 108 may be housed in a common housing with the one or more processors 106, respectively. In an alternative embodiment, the memory 108 may be located remotely with respect to the physical location of the processors 106 and the controller(s) 104.

In some embodiments, the system 100 includes a user interface 102 communicatively coupled to the controller(s) 106. In some embodiments, the user interface 102 may include a full-flight cockpit including joysticks, engine thrust levers, parking levers, etc. In some embodiments, the user interface 102 may include input devices such as a mouse, keyboard, and microphone, and output devices such as a headset, microphone, headphones, and/or speakers.

In some embodiments, a display 104 communicatively coupled to the controller(s) 106 and viewable to a user of the system 100 may be configured to display flight operation data to the user of the system 100. The display 104 may include any display known in the art. For example, the display 104 may include, but is not limited to, a liquid crystal display (LCD), an organic light-emitting diode (OLED) display, or a CRT display. In some embodiments, the display may be a flight display (FD) or adaptive flight display (AFD) and may include custom ASIC and FPGA hardware.

Figure 2:
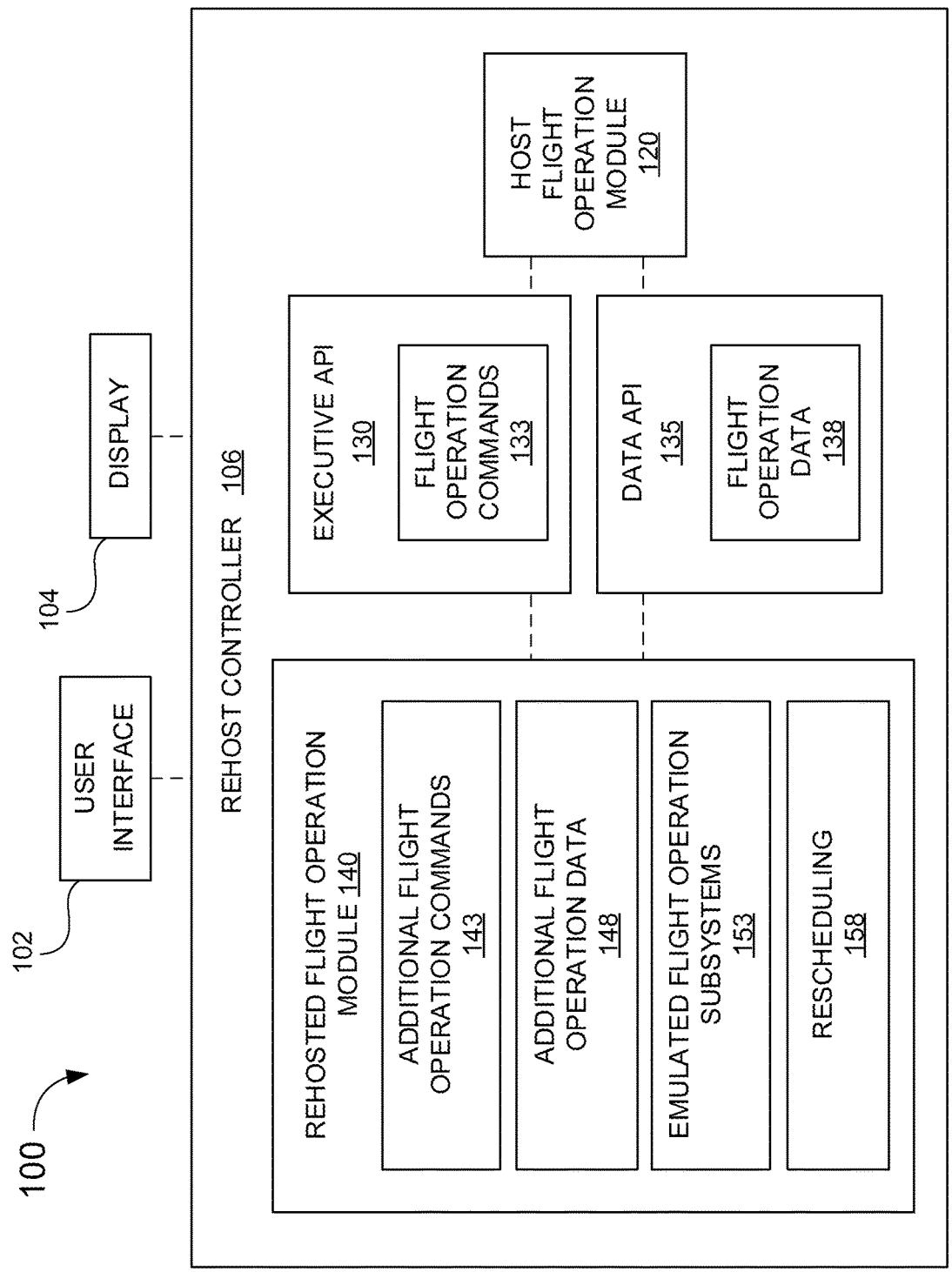
FIG. 2 is a diagram illustrating a rehosted flight operation system including a single controller, in accordance with one or more embodiments of the present disclosure.

FIG. 2 is a diagram illustrating a rehosted flight operation system 100 including a single controller 106, in accordance with one or more embodiments of the present disclosure. In this embodiment, host operation module 120 and the rehosted flight operation module may be stored on the memory 110 and may be executed by the processors 108 on the same controller 106. An executive API module 130 and a data API module 135 may facilitate communication between the host flight operation module 120 and the rehosted flight operation module 140.

The host flight operation module 120 may cause the one or more processors 108 to generate flight operation commands 133 and flight operation data 135. The flight operation data 135 may include, for example, flight speed, engine thrust, altitude, horizon orientation, wind speed, wind direction, fuel amount, parking brake indicator, flight control system indicators, etc. The flight operation commands 133 may change a state of the flight (e.g., start, stop, freeze or pause a simulation, change the location of a simulated aircraft, etc.) or manipulate the flight operation data 138 (e.g., increase or decrease engine thrust, actuate rudders, flaps, spoilers, etc).

The executive API module 130 may provide paths to transmit the flight operation commands 133 (e.g., start the flight simulation, pause or freeze the flight simulation, increase engine thrust, disengage parking brake, etc.) from the host flight operation module 120 to the rehosted flight operation module 140, and vice versa. The data API module 135 may provide calls or requests to create, read, update, and delete the flight operation data 138 (e.g., current speed, current altitude, current thrust) from the host flight operation module 120 to the rehosted flight operation module 140, and vice versa.

In some embodiments, the data API module 135 may emulate an avionics data bus (e.g., defined by avionics communication protocol) to provide a highly realistic and immersive flight operation experience. In this way, the same API module 130 can integrate different host flight operation modules 120 with the rehosted module 140, where each alternative host flight operation module 120 is implemented using different hardware and different programming language(s). For example, if the host operation module 120 is programmed with a compiled programming language (e.g., C++), and the rehosted operation module 140 is programmed with an interpreted programming language (e.g., Python), the API module 130 may facilitate communication between the module 120 and 140 by providing generic API calls to the module 120 that are agnostic to any particular programming language (e.g., using Extensible Markup Language [XML] or JavaSript Object Notation [JSON]). In another example, a host operation module 120 developed by a different manufacturer is programmed with another compiled programming language (e.g., Java), and the rehosted operation module 140 is programmed with the same interpreted programming language (e.g., Python). Thus, in this way, the rehosted flight operation module 140 and the API modules 130 and 135 may stay consistent when integrating host flight operation modules 120 developed by different manufacturers (e.g., customers), which greatly reduces the engineering and customer support burden on the developer of the rehosted flight operation system 100.

The rehosted flight operation module 140 may cause the one or more processors 108 to receive the flight operation commands 133 and the flight operation data 135 from the host flight operation module 120 using the API modules 130 and 135. The rehosted flight operation module 140 may further cause the one or more processors 108 to generate additional flight operation commands 143 and additional flight operation data 148. In some embodiments, the additional commands 143 and the additional data 148 generated by the rehosted module 140 may be similar to (e.g. may parallel) the flight operation commands 133 and flight operation data 138 generated by the host module 120. In this sense, the additional commands 143 and the additional data 148 may replicate and complement, in parallel, the commands 133 and data 138 generated by the host operation module 120. In some embodiments, the additional commands 143 and the additional data 148 may override (e.g., take priority) over the commands 133 and the data 135 (e.g., for hardware performance purposes).

In some embodiments, the additional commands 143 and the additional data 148 generated by the rehosted module 140 may add functionality not included in the commands 133 and data 138 generated by the host module 120. For example, the additional commands 143 may include functionalities defined by the Aeronautical Radio, Incorporated (ARINC) 610 standard. The ARINC 610 standard provides guidance for the functionality of avionics equipment and software in flight simulations. In this way, the ARINC commands (e.g. additional commands 143) may be implemented on top of the commands 133 of the host module 120. Some of the major functionalities that the ARINC standard defines may include flight data manipulation (e.g., modifying aircraft data or flight plans), environmental changes (e.g., wind speed and direction), freezes, repositions, snapshots, and recalls (e.g., phase of flight changes).

For example, freezes may stop or pause the entire flight simulation or only certain parts of the flight simulation and may include a total freeze, flight freeze, fuel freeze, latitude/longitude freeze, altitude freeze, etc. Freezes may be used to support aircraft movement in space (e.g., during a recall) and pause a training scenario (e.g., to instruct a student). Repositions may move the simulated aircraft and associated avionics to a new position in the simulation. Repositions may be used to support initial conditions, slew, snapshot, recall and other scenarios that require a change in position. Snapshots may use non-volatile memory (NVM) and other binary files to store current state information for the simulated aircraft and its simulated environment at a specific moment in time. Recalls may load state information stored by a snapshot to change the simulated aircraft and its simulated environment to a specified state. Snapshots and recalls may be used to support reuse of specified training scenarios (e.g., takeoffs, landings, and emergency conditions). Reposition, snapshot and recall implementation may vary depending on the aircraft and the training scenarios required by a particular manufacturer.

In some embodiments, the rehosted flight operation module 140 may cause the one or more processors 108 to generate one or more emulated flight operation subsystems 153. The emulated flight operation subsystems 153 may include emulations of actual physical aircraft hardware. In this way, emulation of real aircraft systems enables a realistic testing and training platform, and enables the deployment of OFPs on hardware not originally intended or designed for the OFP. In some embodiments, the emulated flight operation subsystems 153 may include an emulated flight management system (FMS), an emulated flight display (FD), an emulated engine-indicating and crew-alerting system (EICAS), an emulated terrain awareness and warning system (TAWS), an emulated aircraft flight control system (FCS), or an emulated global navigation satellite system (GNSS). In some embodiments, an emulated power input for each of the flight operation subsystems 153 may be generated, and each emulated subsystem 153 may have an "ON" state and an "OFF" state indicated by a discrete value. In some embodiments, the flight operation subsystems 145 may be configured using one or more pre-defined configuration files (e.g., XML configuration files). The configuration files may be used, for example, to load different flight scenarios for a particular implementation of the system 100.

In some embodiments, emulated flight display(s) 153 (e.g., that displays the flight operation data 138 and the additional flight operation data 148) may be displayed on the one or more displays 104. In some embodiments, the data displayed on the emulated flight display 153 may include flight management system (FMS) data, engine-indicating and crew-alerting system (EICAS) data, terrain awareness and warning system (TAWS) data, and aircraft flight control system (FCS) data, air speed data, Machmeter data, altimeter data, attitude or horizon orientation data, thermometer data, airspeed sensor data, magnetic compass data, global navigation satellite system (GNSS) data, radio compass data, barometer data, pitot tube data, cabin air pressure sensor data, cargo air pressure sensor data, cabin temperature sensor data, cargo temperature sensor data, fuel temperature sensor data, fuel pressure sensor data, hydraulic pressure sensor data, weight sensor data, etc. In some embodiments, the emulated FDs 153 may include adaptive flight displays (AFDs), heads up displays (HUDs), radio tuning units (RTUs), control tuning panels (CTPs), cockpit display units (CDUs), standby instruments, etc. The emulated flight display(s) 153 may present the previously described FD data (e.g., the flight simulation data 138 and the additional flight simulation data 148) when displayed on the physical display 104. In this way, by emulating real aircraft hardware, the present system 100 enables a highly realistic environment for pilot training and software testing.

In some embodiments, each emulated flight operation subsystem 153 may be executed as a group of processing instances, where each processing instance of the instance group corresponds to an emulated flight operation subsystem 153. Instance groups may operate asynchronously from each other, and instances in an instance group may run in serial or in parallel. A scheduled processing rate of the group may be defined as the lowest-common-multiple (LCM) of the processing rates of each instance in the instance group. For example, if a left emulated AFD instance of the group operates at a rate of 40 Hz and a right emulated AFD instance of the group operates at a rate of 20 Hz, the target scheduled processing rate of the whole group may be 40 Hz (e.g., with the 40 Hz process signaled every cycle and the 20 Hz process signaled every other cycle). In some embodiments, the calculated LCM is limited such that the target processing rate is less than 1000 Hz.

In some embodiments, the rehosted flight operation module 140 may cause the one or more processors to schedule each of the emulated flight operation subsystems 153 at respective scheduled processing rates (e.g., defined processing rates). In some embodiments, the rehosted flight operation module 140 may cause the one or more processors to measure runtime processing rates (e.g., actual or real-time processing rates) of each of the emulated flight operation subsystems 153. When a runtime processing rate of an emulated flight operation subsystem 153 is unequal to the corresponding scheduled processing rate of the emulated flight operation subsystem 153, the scheduled processing rate may be automatically adjusted to match the runtime processing rate of the emulated flight operation subsystem 153. In this way, the flow of information (e.g., from underperforming hardware) is accommodated, all of the viewable flight deck effects are maintained, and visual glitches and errors are reduced. Subsequently, the rehosted module 140 may cause the one or more processors to display the flight operation data 138 and the additional flight operation data 148 on the one or more displays 104 at the adjusted scheduled processing rate. In this way, the present system 100 reschedules the processing rates of the emulated subsystems 153 (e.g., emulated flight display modules, emulated engine modules, etc.) to account for under-performing hardware (e.g., hardware executing the host module 120). When the scheduled processing rate is adjusted to be lower (e.g., when the runtime processing rate is lower than the scheduled processing rate), the data from the underperforming hardware may be essentially ignored and error message handling may be skipped. The module 140 may automatically identify, evaluate, and reschedule any processes that produce errors (e.g., bad actors). Additionally, the processing rates of emulated subsystems 153 may be manually evaluated and rescheduled for real-time system performance debugging using a graphical user interface (GUI).

Figure 3:
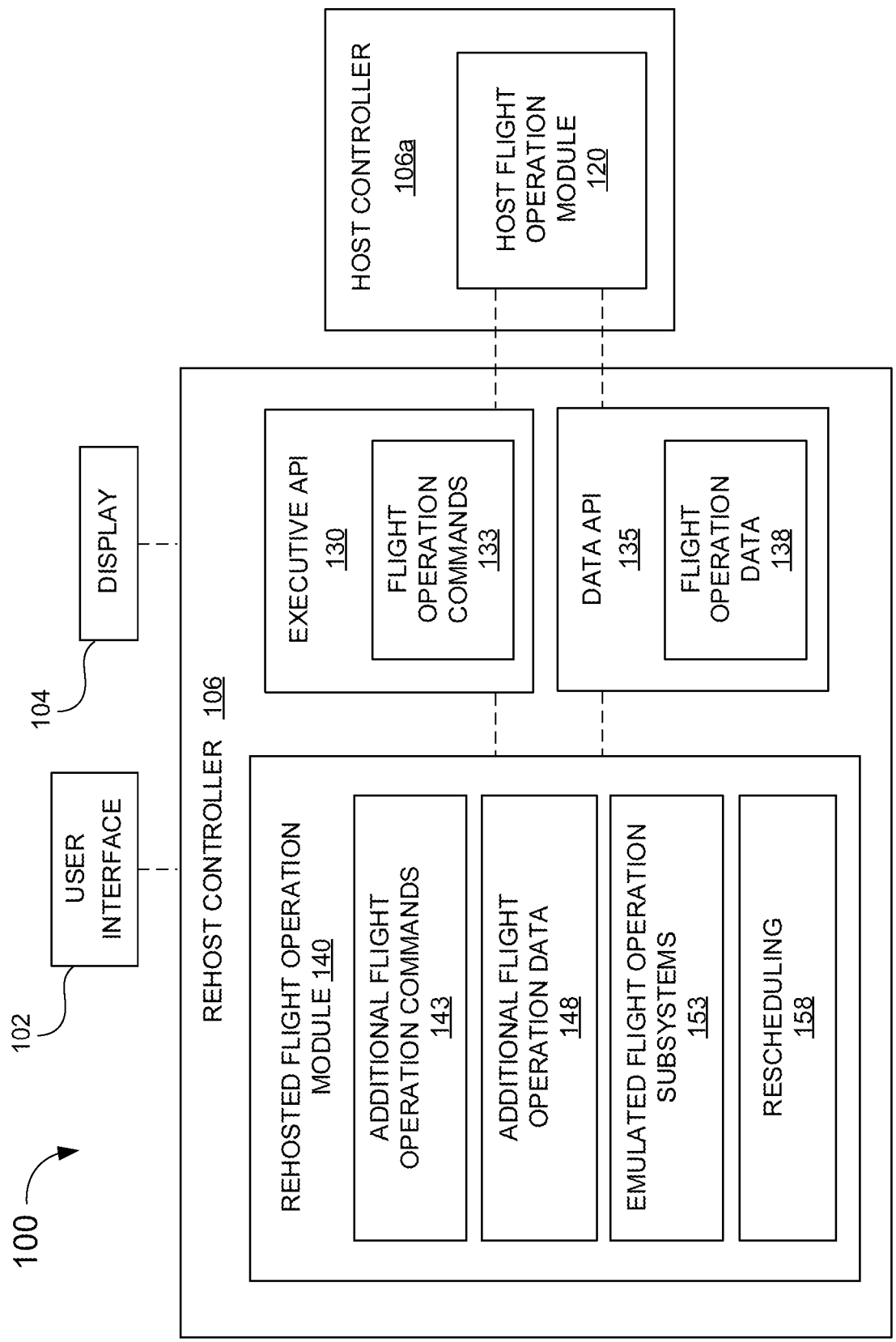
FIG. 3 is a diagram illustrating a rehosted flight operation system including a host controller and a rehost controller, in accordance with one or more embodiments of the present disclosure.

FIG. 3 is a diagram illustrating a rehosted flight operation system 100 including a host controller 106a and a rehost controller 106b, in accordance with one or more embodiments of the present disclosure. The components described with respect to FIG. 3 may be substantially identical to the similarly named components described with respect to FIG. 2. In this embodiment, host operation module 120 may be stored on the memory 110 and may be executed by the processors 108 as a part of the host controller 106a (e.g., sharing a common housing and motherboard with the host controller 106a). The rehosted flight operation module 140 may be stored on the memory 110 and may be executed by the processors 108 as a part of the rehost controller 106b (e.g., share a common housing and motherboard with the rehost controller 106b).

Figure 4:
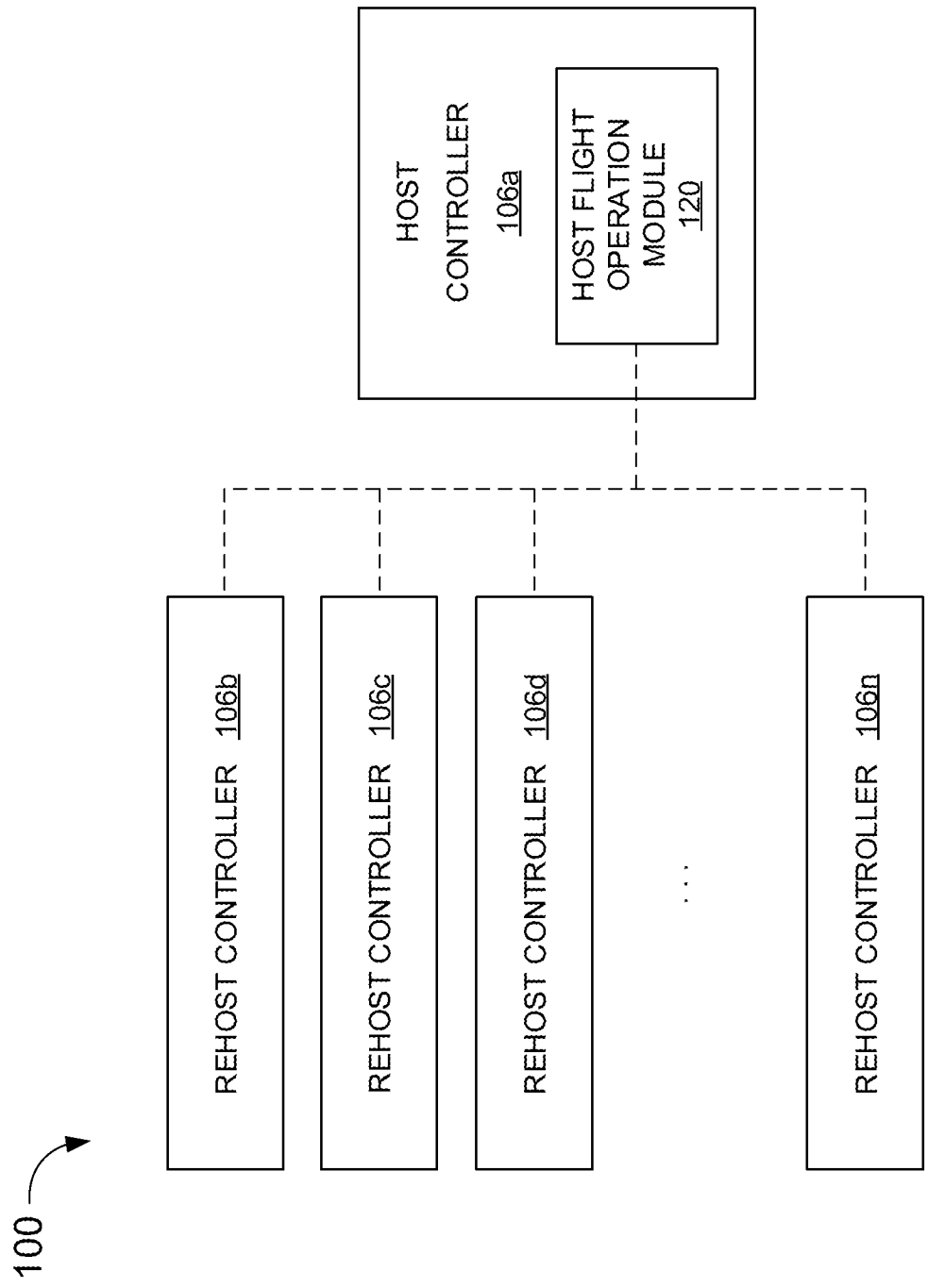
FIG. 4 is a diagram illustrating a rehosted flight operation system including a host controller and a plurality of rehost controllers, in accordance with one or more embodiments of the present disclosure.

FIG. 4 is a diagram illustrating a rehosted flight operation system 100 including a host controller 106a and a plurality of rehost controllers 106b-n, in accordance with one or more embodiments of the present disclosure. The components described with respect to FIG. 4 may be substantially identical to the similarly named components described with respect to FIGS. 2-3. In this embodiment, host operation module 120 may be stored on the memory 110 and may be executed by the processors 108 as a part of the host controller 106a (e.g., sharing a common housing and motherboard with the host controller 106a). A plurality of rehosted flight operation modules 140 may be executed as separate flight operation instances by each of the rehost controllers 106b-n. In some embodiments, a plurality of separate simulated aircraft and simulated flight environments may be generated using a single host module 120.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A rehosted flight operation system, comprising:
one or more controllers, wherein the one or more controllers include one or more processors configured to execute program instructions, wherein the program instructions include:
a rehosted flight operation module, wherein the rehosted flight operation module causes the one or more processors to: generate one or more emulated flight operation subsystems; and
a host flight operation module, wherein the host flight operation module causes the one or more processors to: generate flight operation data and flight operation commands for the one or more emulated flight operation subsystems;
wherein the rehosted flight operation module further causes the one or more processors to:
schedule each of the emulated flight operation subsystems at respective scheduled processing rates;
measure respective runtime processing rates of each of the emulated flight operation subsystems; and
responsive to the runtime processing rate of at least one of the emulated flight operation subsystems being unequal to the corresponding scheduled processing rate of the at least one emulated flight operation subsystem, automatically adjust the scheduled processing rate of the at least one emulated flight operation subsystem to match the runtime processing rate of the at least one emulated flight operation subsystem,
wherein the program instructions further include an executive application programming interface (API) module, wherein the executive API module causes the one or more processors to:
transmit the flight operation commands from the host flight operation module to the rehosted flight operation module, and
transmit the flight operation commands from the rehosted flight operation module to the host flight operation module.

2. The system of claim 1, wherein the one or more controllers comprise a single controller.

3. The system of claim 1, wherein the one or more controllers comprise a plurality of controllers.

4. The system of claim 1, wherein the program instructions further include a data API module, wherein the data API module causes the one or more processors to:
transmit the flight operation data from the host flight operation module to the rehosted flight operation module, and
transmit the flight operation data from the rehosted flight operation module to the host flight operation module.

5. The system of claim 1, wherein the rehosted flight operation module further causes the one or more processors:
generate an emulated power input for each of the emulated flight operation subsystems.

6. The system of claim 1, wherein the rehosted flight operation module further causes the one or more processors:
configure the emulated flight operation subsystems using one or more pre-defined configuration files.

7. The system of claim 1, wherein the one or more emulated flight operation subsystems include an emulated flight display (FD), and the emulated FD is displayed on one or more displays viewable to a user of the system.

8. The system of claim 1, wherein at least a portion of the host flight operation module is programmed with a first programming language, at least a portion of the rehosted flight operation module is programmed with a second programming language, and the first programming language is different from the second programming language.

9. The system of claim 8, wherein the first programming language is a compiled programming language and the second programming language is an interpreted programming language.

10. The system of claim 1, wherein the emulated flight operation subsystems include at least one of an emulated flight management system (FMS), an emulated flight display (FD), an emulated engine-indicating and crew-alerting system (EICAS), an emulated terrain awareness and warning system (TAWS), an emulated aircraft flight control system (FCS), or an emulated global navigation satellite system (GNSS).

11. The system of claim 1, wherein the flight operation data includes at least one of:
air speed data, Machmeter data, altimeter data, attitude or horizon orientation data, thermometer data, airspeed sensor data, magnetic compass data, radio compass data, barometer data, pitot tube data, cabin air pressure sensor data, cargo air pressure sensor data, cabin temperature sensor data, cargo temperature sensor data, fuel temperature sensor data, fuel pressure sensor data, hydraulic pressure sensor data, or weight sensor data.

12. The system of claim 1, wherein the flight operation data includes a simulated aircraft and a simulated environment for the simulated aircraft.

13. The system of claim 12, wherein the additional flight operation commands include at least one of:
a reposition of the simulated aircraft in the simulated environment,
a freeze or pause of the simulated aircraft and the simulated environment,
a snapshot or recall of the simulated aircraft and the simulated environment, or
an adjustment of a direction of simulated wind and a speed of the simulated wind.

* * * * *